US006701601B2

(12) United States Patent
Davidson et al.

(10) Patent No.: US 6,701,601 B2
(45) Date of Patent: Mar. 9, 2004

(54) METAL BODY PAINTING SYSTEM AND METHOD

(75) Inventors: Dennis D Davidson, Troy, MI (US); John C Hess, Rochester, MI (US); Tommy L Anderson, Ypsilanti, MI (US); Rodney L Briggs, Linden, MI (US); Robert J Shaffer, Franklin Village, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 175 days.

(21) Appl. No.: 09/898,207

(22) Filed: Jul. 3, 2001

(65) Prior Publication Data

US 2003/0005568 A1 Jan. 9, 2003

(51) Int. Cl.[7] .................. B23P 25/00
(52) U.S. Cl. .................. 29/458; 247/421
(58) Field of Search .................. 29/458; 247/421, 247/427, 180, 189, 345, 458, 478

(56) References Cited

U.S. PATENT DOCUMENTS 4,607,592 A * 8/1986 Richter .................. 118/689
4,661,385 A * 4/1987 Holyk .................. 427/345
5,153,028 A * 10/1992 Shutic et al. .................. 427/180
5,428,880 A * 7/1995 Tomioka et al. .................. 29/458
6,099,898 A * 8/2000 Joyce et al. .................. 427/196
6,129,946 A * 10/2000 Adams .................. 427/8
6,291,018 B1 * 9/2001 Dattilo .................. 427/377
6,506,458 B1 * 1/2003 Blatter et al. .................. 427/493
2001/0016230 A1 * 8/2001 Matsuoka et al. .................. 427/385.6
2002/0122892 A1 * 9/2002 Dattilo .................. 427/421
2002/0182335 A1 * 12/2002 Coulibaly et al. .................. 427/424

* cited by examiner

*Primary Examiner*—Gregory Vidovich
*Assistant Examiner*—Stephen Kenny
(74) *Attorney, Agent, or Firm*—Donald J. Wallace

(57) ABSTRACT

A method of manufacturing a body, preferrably an automotive vehicle body, to have a plurality of coating layers, starts with assembling the body out of parts made from pre-coated metal. A pretreatment step provides for paint adhesion and/or corrosion protection for cut edges, weld spots or metal finished areas. A powder paint base coat is then applied onto the pre-coated metal of the vehicle body. The pre-coat layer is one of the plurality of coating layers and the powder paint base coat is another one of the plurality of coating layers. In another embodiment, the powder paint base coat is applied in two steps, a first powder paint base coat and a color powder paint base coat. The first powder paint base coat is applied to a first portion of the vehicle body and the color powder paint base coat is applied to a second portion of the vehicle body. Unused first powder paint base coat and unused color powder paint base coat are both reclaimed, mixed, and the mixture used for at least some of the first powder paint base coat applied to the first portion of the vehicle body.

25 Claims, 5 Drawing Sheets

METAL BODY PAINTING SYSTEM AND METHOD

FIELD OF THE INVENTION

The present invention relates generally to painting of fabricated items, and more particularly to a method for manufacturing a painted body-in-white for an automotive vehicle.

BACKGROUND

As is known, one of the processes involved in the manufacture of automotive vehicles is the painting of what is termed the body-in-white. A body-in-white is the body shell for automotive vehicles prior to any further assembly of the vehicle, such as installation of the powertrain and interior. Typically, the body-in-white is assembled from metal parts. After the body-in-white is assembled, it is painted. Once painted, the remainder of the vehicle assembly operations, such as installation of the powertrain and the interior of the vehicle, are completed.

The painting process used to paint the body-in-white is one of the critical processes in the manufacture of an automotive vehicle. This painting process gives the automotive vehicle its color and also much of its corrosion protection and resistance. If the painting process is flawed, the vehicle's color may fade over time, corrosion may occur more quickly, or the vehicle experiences other known painting process related problems.

The painting systems, usually termed paint shops, used to paint automotive vehicles are large, complex and expensive. Moreover, in the modem paint shops used to paint the body-in-white for automotive vehicles, controlling the emissions of volatile organic compounds and reducing the energy used is an ongoing challenge. Additionally, the number of paint layers have been increased to meet more stringent requirements, resulting in considerable additional complexity and expense in building and operating a paint shop.

Referring to FIG. 1, a generic manufacturing process 10 for manufacturing a painted body-in-white for an automotive vehicle is described. A vehicle body 11 is manufactured in a body shop 13 by fabricating body parts (not shown) at step 14 from galvanized and/or uncoated steel 12, usually in coil form and then assembling the vehicle body 11 by welding, fastening or adhesive bonding these parts at operation 16. Vehicle body 11 is now at the body-in-white stage.

After it is assembled, vehicle body 11 enters paint shop 19. Once entering the paint shop 19, vehicle body 11 is cleaned at cleaning station 20, which is typically one or more cleaning baths or spray tanks. After being cleaned, vehicle body 11 is phosphated by passing it through a phosphating bath or spray operation 22 where zinc phosphate is applied to vehicle body 11. As is known, the cleaning and phosphating operations are critical steps in the prior art paint processes because how well the body-in-white is cleaned and the quality of the zinc phosphate application significantly impact the corrosion protection that the painting process imparts to the automotive vehicle body as well as how well the paint adheres to the vehicle body. It is also well known that the cleaning and phosphating steps may consist of up to 10 or 12 individual treatment stations.

After the phosphating operation 22, the vehicle body 11 is passed through an e-coat operation 24 where e-coat is applied to the vehicle body 11. As is known, the e-coat application provides significant corrosion protection to the vehicle body 11. After the e-coat application, the e-coat is cured 26 by passing the vehicle body 11 through an e-coat oven 26. Next, the vehicle body 11 may be sanded and repaired at operation 28 and its seams sealed at seam sealer operation 30 by the application of a sealer to the seams of the vehicle body 11. The sealer is cured by passing the vehicle body 11 through a sealer oven 32. A primer is then applied to the vehicle body in primer paint booth 34. This primer can be a liquid primer or a powder coat primer. The primer is then cured by passing the vehicle body through a primer oven 36.

After the primer is cured, the primer may be sanded and/or repaired at operation 38 prior to the application of the color base coat. The color base coat is applied to the vehicle body 11 in base coat paint booth 40. In most cases, the color base coat is a liquid paint that emits volatile organic compounds which must be collected and processed with appropriate emission control systems. In some cases, such as in the painting of the metal part of the vehicle body for the Smart car manufactured by DaimlerChrysler A.G., a powder base coat is used. However, the use of powder base coats presents certain problems that aren't presented by the use of liquid base coats, as will be discussed below. In cases where the base coat used is a waterborne paint, the vehicle body 11 is next dried by passing the vehicle body 11 through a base coat flash-off oven 42.

A clear coat is next applied to the vehicle body 11 in clear coat paint booth 44. After the clear coat is applied, the base coat and the clear coat are fully cured by baking the vehicle body 11 in a top coat oven 46. The color base coat and clear coat are often referred to collectively as the top coat. After the top coat is cured, the painted vehicle body 11 is inspected and any necessary finesse operations (touch up, etc.) carried out at operation 48. The painted vehicle body 11 is then ready for use in subsequent assembly operations to complete the assembly of a vehicle. Painted vehicle body 11 at the stage where it exits paint shop 19 and before any subsequent assembly operations is referred to as a painted body-in-white.

The color base coat, clear coat, and inspection and finesse operations typically consume more time than the steps preceding them. Consequently, many paint shops provide multiple paths for these operations, as shown in FIG. 1, to maximize the capacity of paint shop 19.

As can be seen, the painting process used to paint automotive vehicle bodies is complex. Further, the paint shops used to implement this process are often large and expensive. The cost of a paint shop used in the manufacture of high volume automotive can easily exceed several hundred million dollars.

It is an object of this invention to simplify the process used to manufacture painted metal body shells, such as a painted body-in-white, during the original equipment manufacture of the product in which the metal body is used, such as an automotive vehicle.

It is a further object of this invention to simplify the paint shop used to paint the body-in-white for an automotive vehicle.

It is another object of this invention to reduce the volatile organic compounds emitted during the painting of a vehicle body-in-white.

It is another object of this invention to reduce the amount of energy used during the painting of a vehicle body-in-white.

It is another object of this invention to reduce the number of paint layers applied in the paint shop.

It is another object of this invention to reduce the number of cleaning and pretreatment stations required.

SUMMARY OF THE INVENTION

A method of painting automotive vehicle bodies in accordance with this invention A method of manufacturing a body, preferably an automotive vehicle body, to have a plurality of coating layers, starts with assembling the body out of parts made from pre-coated metal, such as pre-coated galvanized steel. The galvanized steel may be produced either by the hot dip galvanized process or by the electro-galvanized process. Additionally the galvanized may be either a zinc or zinc alloy material.

After cleaning and pretreatment, a powder paint base coat is then applied onto the pre-coated metal of the vehicle body. The pre-coat layer is one of the plurality of coating layers and the powder paint base coat is another one of the plurality of coating layers.

In another embodiment, the powder paint base coat is applied in two steps, a first powder paint base coat and a finished color powder paint base coat. The first powder paint base coat is applied to a first portion of the vehicle body and the finished color powder paint base coat is applied to a second portion of the vehicle body. Unused first powder paint base coat and unused finished color powder paint base coat are both reclaimed, mixed, and the mixture used for at least some of the first powder paint base coat applied to the first portion of the vehicle body.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION OF THE PREFERRED EMBODIMENTS

Figure 2:
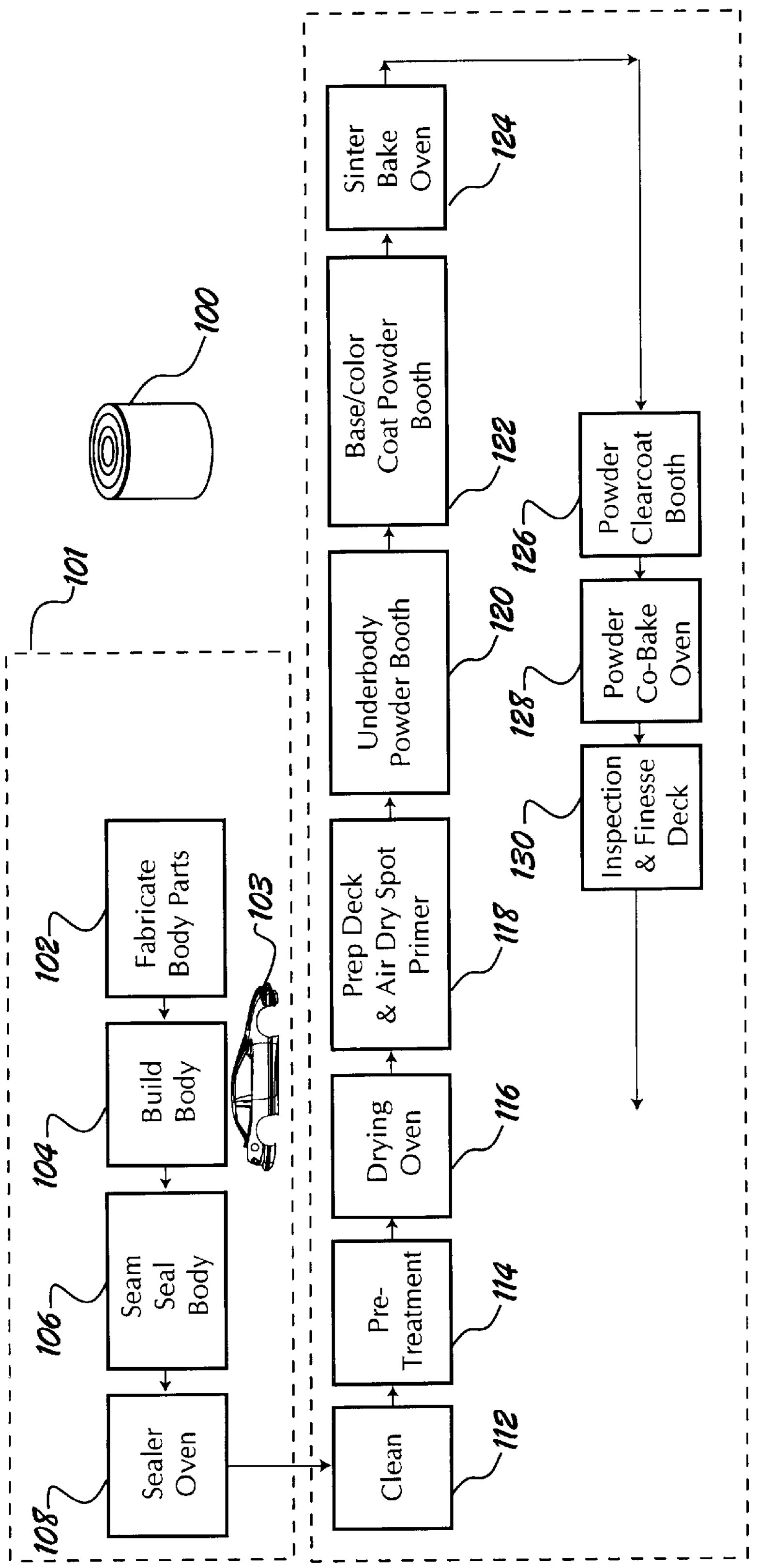
FIG. 2 is a process flow chart of the manufacturing process to produce a painted metal body in accordance with this invention.

FIG. 2 illustrates a process flow of a preferred embodiment of the manufacturing process of this invention. A vehicle body 103 is manufactured in a body shop 101. Parts (not shown) for vehicle body 103 are cut and stamped from pre-primed or pre-coated steel 100, preferably pre-primed galvanized steel in coil form, at operation 102. Pre-primed or pre-coated steel, which terms are used interchangeably herein, is known in the art and is steel to which a thin coating of paint, such as paint primer, has been applied prior to the fabrication of parts from the steel.

Figure 3:
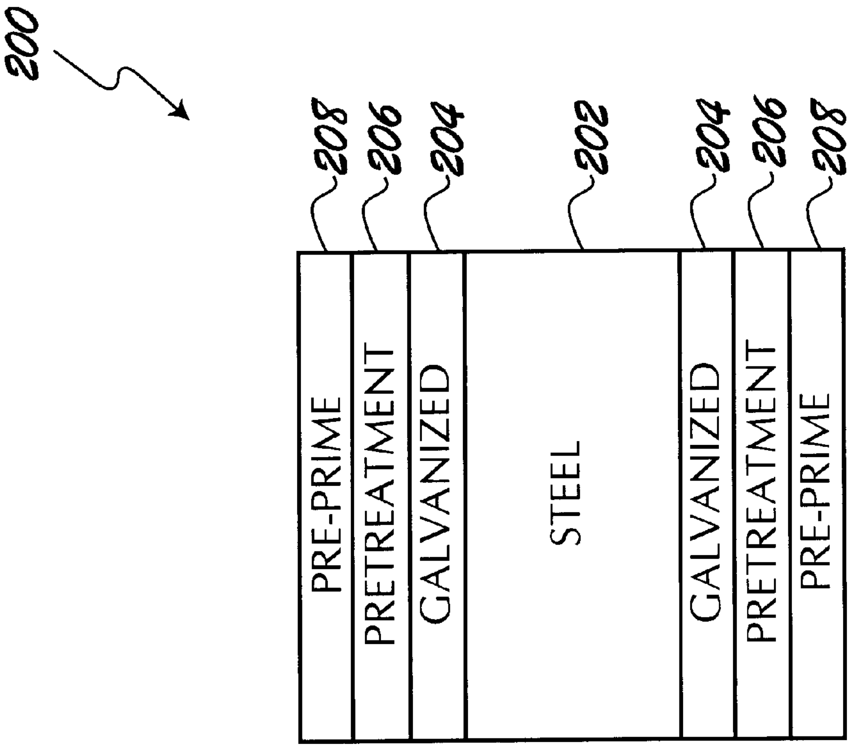
FIG. 3 (Prior Art)
FIG. 3 is a cross-section of a piece of pre-primed steel.

FIG. 3 shows in cross-section a piece of pre-primed galvanized coil steel stock 200. Pre-primed steel 200 has a central layer of steel 202 with a galvanized layer 204 on each side. On top of each galvanized layer 204 is an optional pretreatment layer 206, such as provided by a dry-in-place conversion coating operation. On top of each pretreatment layer 206 is a paint pre-primer layer 208. Pre-primer layer 208 is a thin layer of paint, such as paint primer, typically having a thickness of 2 microns to 15 microns. Pre-primed steels that can be illustratively used in the in the inventive process are the pre-primed steels made by PPG Industries, Inc. One PPG Place, Pittsburgh, Pa., 15272 and marketed under the trade names Bonazinc 3000R and Bonazinc 3001 and the pre-primed steel made by Henkel Surface Technologies, 32100 Stephenson Highway, Madison Heights, Mich. 48071 and marketed under the tradenames Granocoat S, Granocoat ZE and Granocoat LC. It should be understood that the inventive process is not limited to these specific pre-primed steels and other pre-primed steels formulated to have the characteristics required for use in automotive bodies, which characteristics are known in the art, can also be used in the inventive process.

Vehicle body 103 is next assembled at operation 104 from the parts (not shown) fabricated in operation 102 (which those familiar with automotive vehicle body part fabrication understand to involve multiple operations) and after the vehicle body 103 is assembled, its seams are sealed at seam sealer operation 108, such as by use of a caulking type of seam sealer. The seam sealer is cured by passing vehicle body 103 through an optional sealer oven 108. Alternatively, the sealer operation may be placed after the drying oven 116 and before the underbody paint booth 120, thereby utilizing the sinter bake oven 124 to cure or partially cure the seam sealer.

Figure 1:
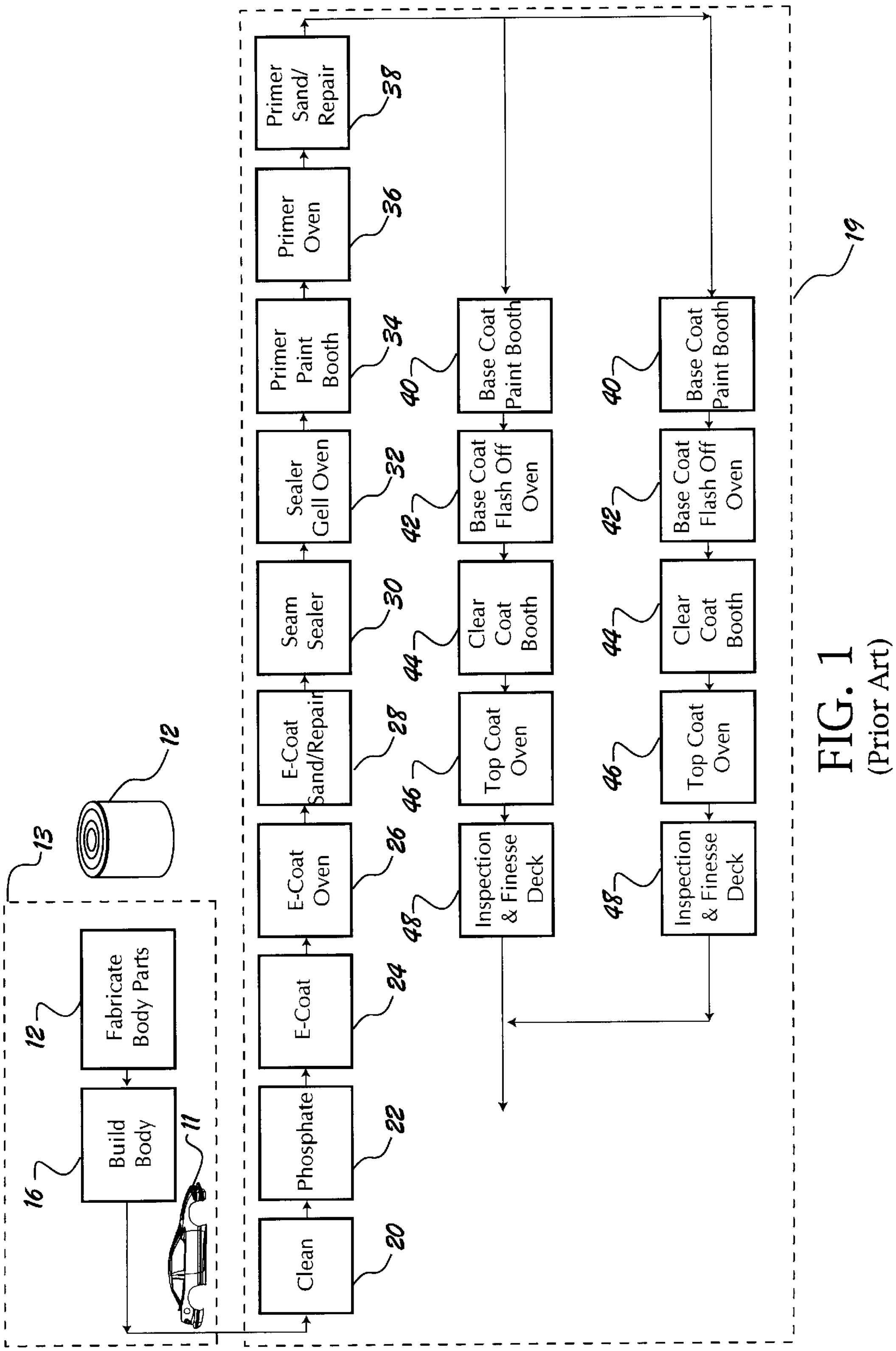
FIG. 1 (Prior Art)
FIG. 1 is a process flow chart of a prior art vehicle body manufacturing process, including the painting process.

The vehicle body 103 now enters paint shop 110 where it is cleaned in cleaning operation 112 and pretreated in pretreatment operation 114. Pretreatment operation 114 is a surface conversion or treatment to promote paint adhesion and that may also retard corrosion depending on the type of surface conversion operation, such as a zinc or iron phosphate pretreatment. However, since the body-in-white is manufactured from pre-primed steel 103 which provides corrosion protection and adhesion of the subsequent paint layers, the pretreatment step 114 is principally to treat any bare metal in vehicle body 103 due to fabrication operation 102 and body build operation 104, such as might be caused by metal finishing of surface defects, the attachment of miscellaneous uncoated parts and fasteners, cut edges of stamped parts, or welds areas. As such, the pretreatment operation of step 114 can be a more abbreviated zinc phosphate or other pretreatment operation than zinc phosphate operation 22 used in the prior art automotive vehicle body painting processes illustrated by the process of FIG. 1. Pretreatment operation 114 may also be a passivation rinse coat type of surface conversion operation, an autodeposition paint coating operation, an organic coating containing complex metal oxides treatement, or other comparable pretreatment operation capable of promoting paint adhesion on bare metal whilst providing additional corrosion protection.

After being pre-treated, vehicle body 103 is next dried in a drying oven 116. Then, vehicle body 103 may be touched-up at operation 118 where any bare spots in the pre-coat primer that may have been caused by the vehicle body parts fabrication and vehicle body build operations 102, 104 are touched-up with a primer and vehicle body 103 is otherwise prepared for the application of the paint base coat.

The paint base coat, usually referred to as the base coat, is preferably applied to the vehicle body 103 in two steps, in underbody paint booth 120 where the base coat is applied to the underbody and all other surfaces of vehicle body 103 that are not visible when vehicle body 103 is assembled into a completed vehicle and in color base coat paint booth 122 where the finished color base coat is applied to the exterior surfaces of the vehicle body 103 that are visible when vehicle body 103 is assembled into a completed vehicle. In a preferred embodiment of the invention, the base coat applied to the underbody and the base coat applied to the remainder of the vehicle are both powder paint coats, as will be described in more detail below.

After the base coats are applied, they are sintered by passing vehicle body 103 through a sinter bake oven 124. After sintering, a clear coat is applied to vehicle body 103 in clear coat paint booth 126. Preferably, the clear coat is a powder clear coat. After the clear coat is applied, the clear coat and base coats are cured in bake oven 128. Next, vehicle body 103 goes through inspection and finesse operation 130. The painted vehicle body 103 prior to any further assembly is referred to as a painted body-in-white.

Figure 4:
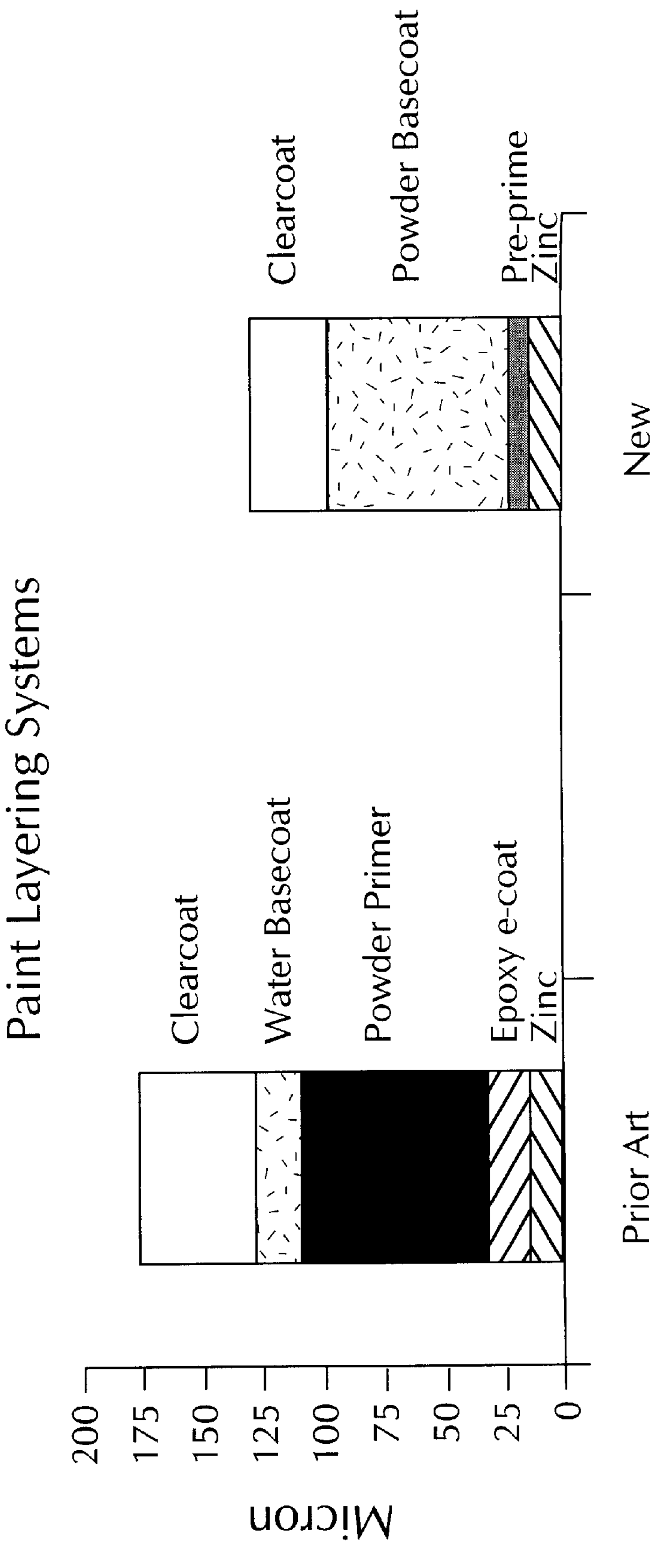
FIG. 4 is a chart showing a comparison between the prior art paint layering system and the paint layering system achieved with the method of this invention.

FIG. 4 is a chart showing the comparison of a typical paint layering system of the prior art and of the inventive process. Referring to FIG. 4, it can be seen that the prior art paint layering system has five layers of coatings totaling almost 175 microns. Further four of the coatings, the e-coat, powder primer, water basecoat, and clear coat, are applied when the vehicle body is painted during the original equipment (OE) manufacturing of the vehicle. In contrast, the paint layering system resulting from the present invention has four layers totaling less than 125 microns. Moreover, only two layers, the powder basecoat and clear coat, are applied when the vehicle body is painted during the original equipment (OE) manufacturing of the vehicle.

The inventive process significantly reduces both the amount of volatile organic compounds emitted and energy consumed during the painting of a vehicle body-in-white. As discussed above, the zinc phosphating operation if used for pre-treatment operation 114 is a more abbreviated and the amount of bare surface treated is significantly less than the zinc phosphating operation 22 used in the prior art painting process shown in FIG. 1. Consequently, lower amounts of sludge and hazardous waste materials are produced in the zinc phosphating operation that can be used for pre-treatment operation 114. Moreover, other types of surface conversion treatments can be used for pre-treatment operation 114 thus reducing further the amount of hazardous waste materials produced by pre-treatment operation 114 and, depending on the surface conversion treatment used, reducing the amount of hazardous waste in pre-treatment operation 114 to zero.

Also, the inventive process eliminates the need for e-coat operation 24 (FIG. 1), thus eliminating the VOC's emitted and energy consumed by e-coat operation 24. By eliminating the e-coat operation, the e-coat primer surfacer operation can also be eliminated. In the case where the primer surface is a liquid paint there is a further elimination of the VOC's emitted and yet another reduction in energy consumption. The inventive process also preferrably uses powder paint for the paint base coat. As is known, powder paint does not emit VOC's and requires less energy to paint in contrast to liquid paints.

One of the problems with using a powder color coat for the base coat is that powder painting like liquid painting is relatively inefficient, with only about sixty-five percent of the paint ending up on the vehicle body. Since powder paint is expensive, the excess powder is typically reclaimed and reused. However, in order to avoid one color contaminating another, powder color paint systems have either had separate reclaim systems for each color or separate paint booths for each color. Additionally, using reclaimed powder contributes to painting defects.

Figure 5:
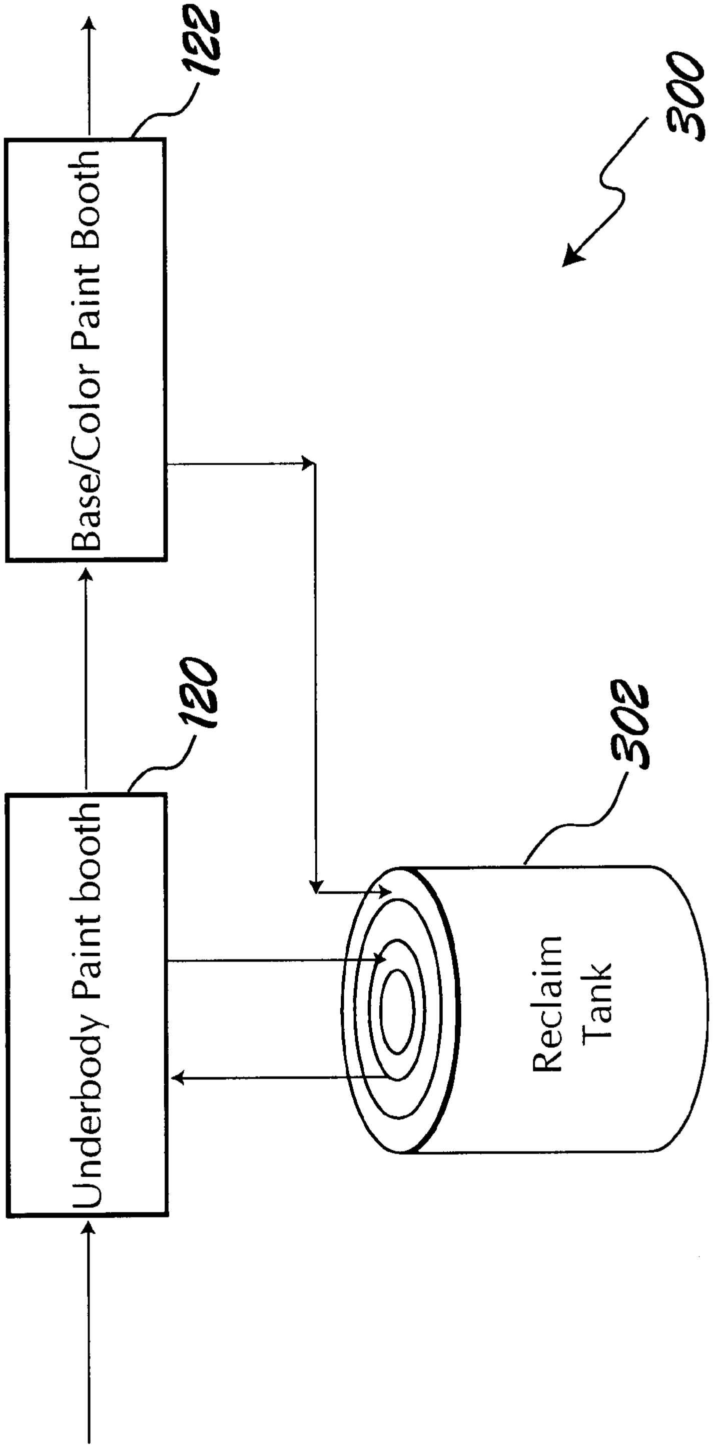
FIG. 5 is a process flow chart of the underbody, base coat and powder reclaim steps preferably used in the painting process of this invention

Referring to FIG. 5, an inventive powder paint reclaim system 300 and method for use in powder painting systems is shown. Powder paint reclaim system 300 is described as it is implemented in the painting system of FIG. 2 and like elements will be identified with the same reference numerals. As discussed with reference to FIG. 2, the underbody and other "non-visible" surfaces of vehicle body 103 are painted with a powder paint in underbody paint booth 120. Excess powder from underbody paint booth 120 is reclaimed into reclaim tank 302. The exterior "visible" surfaces of vehicle body 103 are then painted with a color powder paint in base/color paint booth 122. The excess powder paint from base/color paint booth 122 is also reclaimed into reclaim tank 302 where it mixes with the powder paint reclaimed from underbody paint booth 120. The reclaimed powder in reclaim tank 302 is then provided to underbody paint booth 120 for use in painting the underbody and other "non-visible" surfaces of vehicle body 103.

Since the underbody and other "non-visible" surfaces cannot readily be seen after vehicle body 103 is assembled into a complete vehicle, the color of the underbody and other "non-visible" surfaces of vehicle body 103 need not be any particular color nor have the uniformity and appearance characteristics that the exterior "visible" surfaces of vehicle body 103 must have. Consequently, base/color paint booth 122 can be used for multiple colors as the excess color powder is reclaimed into reclaim tank 302 and used to paint the underbody and other "non-visible" surfaces of vehicle body 103 in paint booth 120. If it is desired that the color of the underbody and other "non-visible" surfaces of vehicle body 103 be more consistent, then a pigmented powder, hereinafter referred to as pigment, can be added to reclaim tank 302. The color and amount of this pigment can be varied depending on the color and amount of the powder paint being reclaimed from paint booths 120 and 122 to result in the desired powder paint color of the powder paint provided to underbody paint booth 120. Also, depending on the amount of powder paint reclaimed from underbody paint booth 120 and base/color paint booth 122, it might be necessary to add additional powder paint to reclaim tank 302 or remove paint powder from reclaim tank 302.

Although the invention has been described in detail with reference to certain preferred embodiments and specific examples, variations and modification exist within the scope and spirit of the invention as described and as defined in the following claims.

What is claimed is:

1. A method of manufacture of painted automotive vehicle bodies, each with a plurality of coating layers, the manufacture of each automotive vehicle body comprising the steps of:

(a) assembling a body-in-white for the automotive vehicle body of pre-coated steel parts having a pro-coat layer, the pre-coat layer comprising a first one of the plurality of coating layers, wherein the body-in-white comprises visible surfaces and hidden surfaces;

(b) applying a powder paint coat, comprising a second one of the plurality of coating layers, onto the pro-coat layer, the powder paint coat consisting of a first powder paint applied to the hidden surfaces of the body-in-white and a second powder paint applied to the visible surfaces of the body-in-white; and (c) reclaiming and combining unused first powder paint and unused second powder paint to form a mixture, wherein the mixture comprises at least a portion of the first powder paint for application to the hidden surfaces of a subsequent body-in-white.

2. The method of claim 1, further comprising the step of applying a clear coat onto the powder paint coat.

3. The method of claim 2 wherein the clear coat comprises a powder clear coat.

4. The method of claim 3, further comprising the step of curing the powder paint coat and the powder clear coat by baking the body in an oven after the clear coat has been applied.

5. The method of claim 4, further comprising the step of sintering the powder paint coat by baking the body in a sintering oven after the powder paint coat has been applied and prior to applying the clear coat.

6. The method of claim 1, wherein the pre-coat layer comprises galvanizing.

7. The method of claim 6, further comprising the step of pre-treating the assembled body by a surface conversion treatment prior to applying the powder paint coat.

8. The method of claim 7 wherein the surface conversion treatment comprises a passivation treatment.

9. The method of claim 7 wherein the surface conversion treatment comprises a zinc phosphate treatment.

10. The method of claim 7 wherein the surface conversion treatment comprises an organic coating containing complex metal oxides treatment.

11. The method of claim 7 wherein the surface conversion treatment comprises an autodeposition paint coating treatment.

12. The method of claim 7 and further including the step of sealing seams of the assembled body prior to pretreating the assembled body.

13. The method of claim 1, further comprising the step of mixing a pigment with the mixture to give the mixture a uniform color.

14. A method of manufacturing a painted automotive vehicle body with a plurality of coating layers, comprising the steps of:

(a) assembling a body-in-white for the automotive vehicle body from parts made from pre-coat steel having a pre-coat layer, the pre-coat layer comprising a first one of the plurality of coating layers, and (b) applying a powder paint base coat onto the pre-coat layer as a first coating layer applied to the body-in-white after the body-in-white is assembled, wherein the body-in-white has first and second distinct surface portions, the step of applying the powder paint base coat comprising applying a first powder paint base coat to the first surface portion of the body-in-white and reclaiming unused first powder paint, applying a second powder paint base coat to the second surface portion of the body-in-white and reclaiming unused second powder paint, and mixing the unused first powder paint with the unused second powder paint to form a mixture, the mixture comprising a portion of the first powder paint base coat for application to the first surface portion of the body-in-white, wherein the first surface portion the body-in-white includes an underbody of the body-in-white.

15. The method of claim 14, and further including the step of applying a clear coat over the powder base coat, the clear coat comprising a third one of the plurality of coating layers.

16. The method of claim 15 wherein the clear coat comprises a powder clear coat.

17. The method of claim 14, further comprising the step of adding a pigment to the mixture to provide a more consistent color for the first powder paint applied to the first surface portion of the body-in-white.

18. The method of claim 14 wherein the second surface portion of the body-in-white includes surfaces of the body-in-white that are visible when the body-in-white is assembled in a completed vehicle.

19. The method of claim 18 wherein the first surface portion of the body-in-white further includes surfaces of the body-in-white that are exposed when the body-in-white has not been assembled in a completed vehicle and that are not visible when the body-in-white has been assembled in a completed vehicle.

20. The method of claim 14, wherein the step of applying occurs in a first paint booth where the first powder paint base coat is applied to the first surface portion of the body-in-white and a second paint booth where the second powder paint base coat is applied to the second surface portion of the body-in-white.

21. In a paint shop for painting a body-in-white, the body-in-white having at least first and second portion, a method for painting the body-in-white with powder paint, comprising the steps of:

(a) applying a first powder paint to the first portion of the body-in-white;

(b) applying a color powder paint to the second portion of the body-in-white;

(c) reclaiming excess first powder paint from the application of the first powder paint to the first portion of the body-in-white;

(d) reclaiming excess color powder paint from the application of the color powder paint to the second portion of the body-in-white; and (e) mixing the reclaimed first powder paint with the reclaimed color powder paint and using the mixture for at least a portion of the first powder paint that is applied to the first portion of the body-in-white, wherein the first portion of the body-in-white includes an underbody of the body-in-white.

22. The method of claim 21 and further including adding a pigment to the mixture to provide a more consistent color for the first powder paint applied to the first portion of the body-in-white.

23. The method of claim 21 wherein the second portion of the body-in-white includes surfaces of the body-in-white that are visible when the body-in-white is assembled in a completed vehicle.

24. The method of claim 23 wherein the first portion of the body-in-white further includes surfaces of the body-in-white that are exposed when the body-in-white has not been assembled in a completed vehicle and that are not visible when the body-in-white has been assembled in a completed vehicle.

25. The method of claim 21 and further including a first paint booth where the first powder paint is applied to the first portion of the body-in-white and a second paint booth where the color powder paint is applied to the second portion of the body-in-white.

* * * * *